United States Patent [19]

Voss

[11] 4,285,301
[45] * Aug. 25, 1981

[54] BIRD CAGE

[75] Inventor: Josef Voss, Haus Dreizehneichen, 5760 Arnsberg 1, Fed. Rep. of Germany

[73] Assignee: Josef Voss, Arnsberg, Fed. Rep. of Germany

[ * ] Notice: The portion of the term of this patent subsequent to Jul. 1, 1997, has been disclaimed.

[21] Appl. No.: 56,102

[22] Filed: Jul. 9, 1979

Related U.S. Application Data

[63] Continuation of Ser. No. 907,866, May 19, 1978, Pat. No. 4,210,100.

[30] Foreign Application Priority Data

Feb. 11, 1978 [DE] Fed. Rep. of Germany ....... 2805866

[51] Int. Cl.$^3$ ...................... A01K 31/06; A01K 31/08
[52] U.S. Cl. ....................................... 119/17; 220/5 R
[58] Field of Search ................... 119/17, 18; 220/5 A, 220/5 R

[56] References Cited

U.S. PATENT DOCUMENTS

| | | | |
|---|---|---|---|
| 2,316,263 | 4/1943 | Little | 119/17 X |
| 3,683,857 | 8/1972 | Yellin | 119/17 |
| 4,210,100 | 7/1980 | Voss | 119/17 |

FOREIGN PATENT DOCUMENTS 888073  8/1953  Fed. Rep. of Germany .......... 220/5 R Primary Examiner—Hugh R. Chamblee
Attorney, Agent, or Firm—Michael J. Striker

[57] ABSTRACT

A bird-cage includes an elongated barrel, which has a wall bounding the interior thereof, upper and lower open ends. The upper open end can be detachably closed by a first discrete end closure, which is formed with a first bent portion directed upwardly when the first closure is installed on the barrel in an operative position to increase the interior volume of the container. The first closure is adapted to be inverted with its bent portion directed down and inwardly into the container in a collapsed position. The lower open end can be detachably closed by a second discrete end closure, which is formed with a second bent portion directed downwardly when this closure is installed in the barrel in the operative position to further increase the interior volume of the container. The second closure can also be inverted with its bent portion directed up and inwardly into the interior in the collapsed position.

6 Claims, 3 Drawing Figures

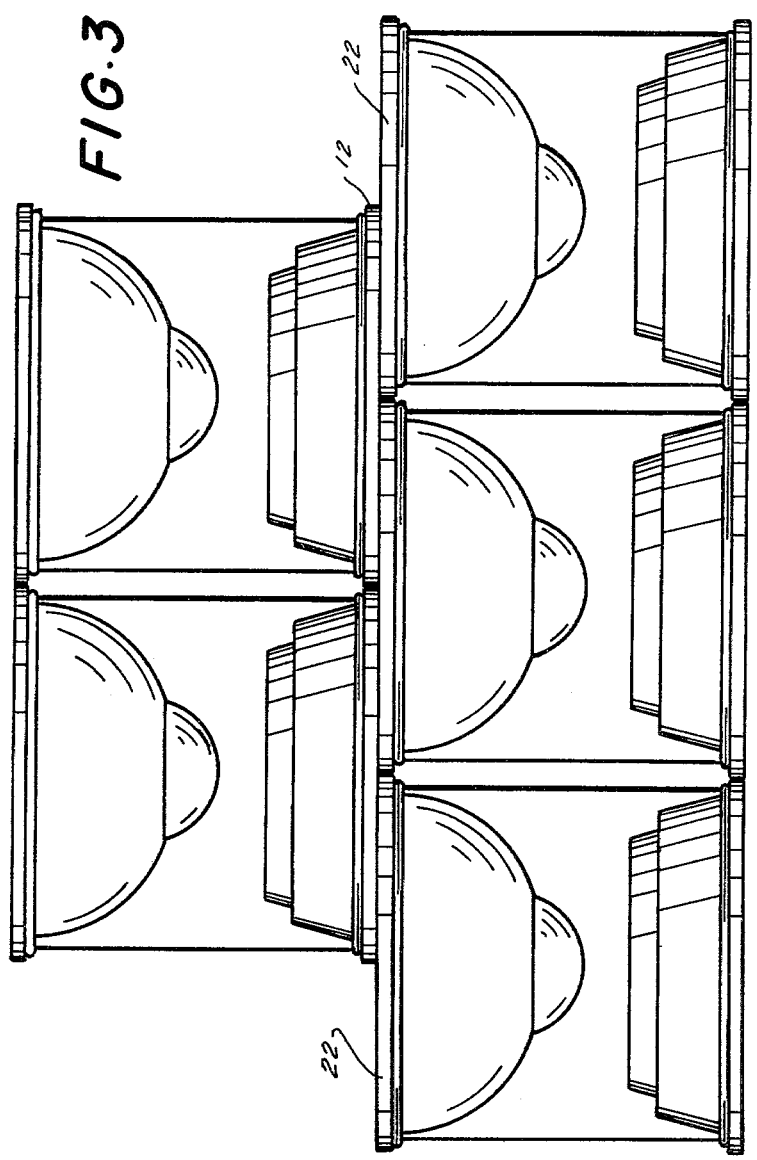

BIRD CAGE

This is a continuation of application Ser. No. 907,866, filed May 19, 1978 now U.S. Pat. No. 4,210,100.

BACKGROUND OF THE INVENTION

This invention relates to bird cages or bird containers. More particularly this invention concerns a collapsible bird-cage.

Bird cages are very well known and usually the interior of such a cage is at least 10 cm high. Such a container usually includes a lattice which is closely connected with a closure usually of plastic material. The connection between the closure and the lattice is easily releasable in order to facilitate detaching of the closure if it is necessary to clean the cage. The detachable parts of such a cage are installed in a position ready to use and are then wrapped in paper or enclosed in a box of corresponding dimensions.

From German Gebrauchsmuster 76 08 125 a cage is known which includes a lattice and a closure tray of plastic material, which is adapted to receive the cage (for storage and transportation purposes) when the latter is turned upside down. This is possible due to positioning of the lattice with a plane surface of its upper portion on a bottom of the closure, whereas the wall of the lattice is received in the interior of the closure between and surrounded by the walls of the latter. Such a construction has a height reduced by about 10 cm, i.e., the height of the tray, compared to the overall height of the cage in erected position. This arrangement is rather convenient for packing and transporting purposes. However, when the knocked-down construction is wrapped in paper for storage and shipping, such wrapping is unable to prevent damage to the closure due to impacts which occur during transportation.

Other examples of bird cages are shown in German Gebrauchsmusters 17 60 428 and 17 62 792. However, the individual components of the cages there disclosed cannot be placed into relative positions in which space is saved and in which these components are in a sufficiently stable position to permit packaging.

SUMMARY OF THE INVENTION

It is a general object of this invention to overcome the above-described disadvantages.

More particularly, it is an object of the invention to provide such a collapsible bird cage or bird container which, when in a collapsed position, will take much less space than in the ready-for-use position.

A further object of this invention is to provide a collapsible container which, when in a collapsed position, will have a readily stable and rigid construction.

Pursuant to these objects, and others which will become apparent hereafter, one feature of the invention resides in a collapsible container, particularly a bird cage, which includes an elongated barrel of a predetermined length, which barrel has a wall bounding the interior of the barrel, an upper open end and a lower open end. The container further includes a first end closure, which is detachably mounted on the barrel for closing the upper end. The first closure is formed with a first bent portion, which directs upwardly when the first closure is installed on the barrel to increase the interior volume of the container. The first closure is adapted to be inverted with the first bent portion directed down and inwardly into the container.

The container also includes a second discrete end closure which is detachably mounted on the barrel for closing the lower end. The second closure also is formed with a second bent portion, which is directed downwardly when the second closure is installed on the barrel to further increase the interior volume of the container. The second closure is adapted to be inverted with the second bent portion directed up and inwardly into the interior.

According to another advantageous feature of the present invention, the container is provided with means for preventing displacement of the first and second closures axially of the barrel and relative to the same.

The container is further provided with means for preventing displacement of the closures relative to the barrel and insuring a stable position of the closures when they are inverted and the bent portions extend inwardly into the interior of the barrel, so that the overall length of the container in such a position is equal only to the predetermined length of the barrel.

For example, a barrel of 30 cm height can receive the inverted first closure, that is an upper closure, of approximately 20 cm height and the second closure, that is a lower closure, of approximately 10 cm height. If the lower closure is provided with an outwardly open recess, then this recess can receive a tip provided on the upper closure, so that the upper closure may be substantially bigger than 20 cm. In other words, in the collapsed position considerably more than half of the initial height of the container can be saved in the interior of the container.

In the collapsed position the upper and lower closure are fixedly received in the interior of the barrel, that is they are protected from being damaged by impacts which occur during transportation of such containers. The reliably stable position of the fixed closures in the collapsed position renders it possible to use a paper-wrapping for the construction. Also, such a construction renders it possible to readily transport the same even without being wrapped up; and such collapsed constructions can also be stored one on the other. Also, it is advantageous that the upper and lower closures of plastic material are protected from damage by being inside the barrel. All accessory parts can be kept in the interior of the upper closure, when the latter is in the inverted position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a view of a plurality of stored cages in accordance with the present invention.

DESCRIPTION OF THE PREFERRED EMBODIMENT

Figure 1:
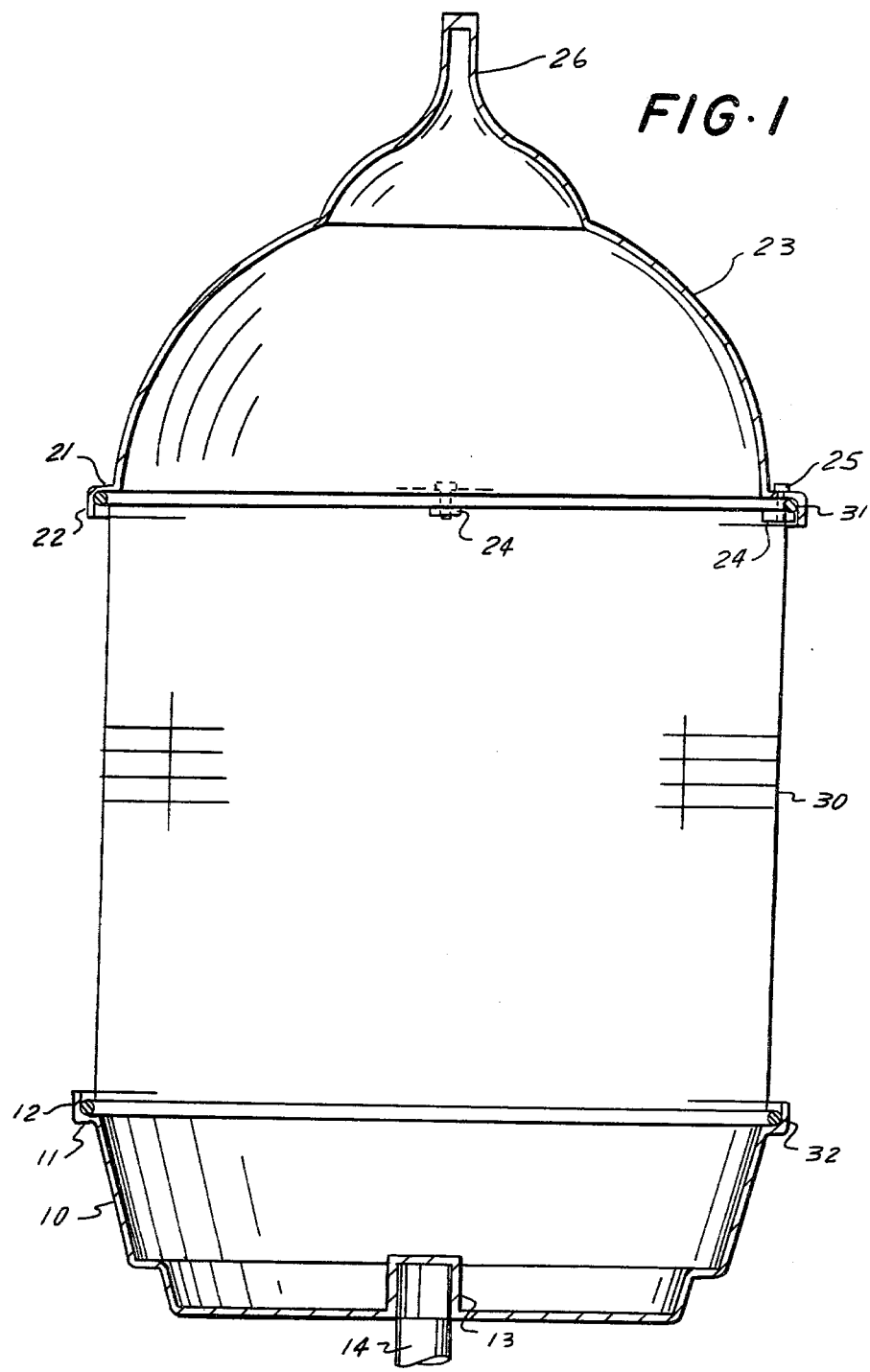
FIG. 1 is a vertical section through a bird cage in accordance with the present invention.

Referring now to the drawings and first to FIG. 1 thereof, it may be seen that the reference numeral 30 is used to designate a lattice barrel made e.g., of metal wire, which is provided with an upper cupola-shaped closure 20 of e.g., synthetic plastic material and a lower closure 10 also of e.g., synthetic plastic material.

The cage according to the embodiment shown in FIG. 1 has a circular cross-section, but the cross-section of the cage does not have any importance for the present invention. The cage may as well have any other desirable cross-section.

The lattice barrel may also be of plastic material, or the upper closure may be of metal. Instead of being cupola-shaped, the upper closure could be box-shaped as well.

According to the embodiment, the lower closure is about 10 cm high, the upper closure with a tip is about 24–26 cm, and the lattice barrel is about 30 cm. It is to be understood that the present invention is not limited as to these dimensions.

The lower closure 10 is formed with a bent portion directed downwardly when this closure is installed on the barrel to increase the interior volume of the container.

The lower closure is so shaped as to be positioned on a support. To accomplish this object the outer surface of the lower closure is provided with a recess 13 open outwardly and designed to receive an upper end portion of the support.

On the upper portion of the lower closure 10, the latter is provided with a stage 11 of plane surface, which is further bent into a cylindrical flange surface 12, which is substantially normal to the stage 11. When the lower closure 10 and the lattice barrel 30 are positioned in ready-for-use position, then a first edge stiffening wire 32 is installed on the inner end face of the plane surface of the stage 11 between the flange 12 and the outer wall of the lattice barrel 30. Due to the cylindrical flange 12 it becomes possible to fix the lattice barrel axially. The lattice barrel 30 and the lower closure 10 are connected to each other by an easily releasable locking element, which is conventional and, therefore, not shown in the drawing.

According to the embodiment the upper closure is of plastic material, and has a cupola-shaped cross-section. The upper-closure is provided with a tip 26.

On the lower portion of the upper closure 23, the latter is provided with a stage 21 of a plane-surface, which is further bent into a cylindrical flange 22 directed downwardly which is substantially normal to the stage 21. When the upper closure 23 is installed on the barrel 30 in the ready-for-use position, a second edge stiffening wire 31 is installed on the inner end face of the plane surface of the stage 21 between the flange 22 and the outer wall of the barrel 30. The upper closure 23 and the barrel 30 are fixedly connected to each other by an easily mounted locking element.

In the embodiment according to the present invention, the locking element comprises a plurality of small plates 24, each of which has a throughgoing hole which is provided with an inner thread. The locking element further includes a plurality of bolts 25 corresponding to the inner thread of the plates 24, so that each of the bolts 25 projects downwardly through corresponding hole in the stage surface 21 of the upper closure 23 and engages with corresponding inner thread of the plate 24, which is installed below the second edge stiffening wire 31. Such a feature renders it possible to insure a compression point of the second edge stiffening wire 31, which point can be accomplished by a user himself in a rather easy manner when he receives the disassembled cage.

There is no requirement to release such a connection during utilization of the case. In order to carry out cleansing of the cage, the user has only to release the lower closure 10 and the barrel 30, which are connected by any easily releasable locking element.

Figure 2:
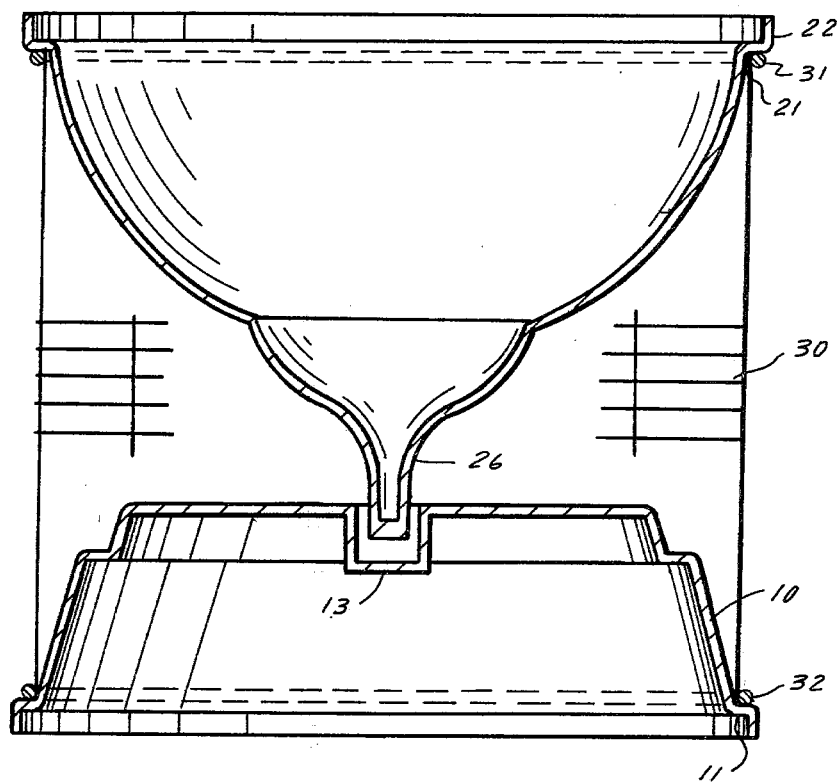
FIG. 2 is a view showing the same cross-section as in FIG. 1, but with the cage in the collapsed position.

FIG. 2 shows the lower closure, the lattice barrel and the upper closure in a collapsed position.

The lower closure 10 is inverted and the bent portion directed up and extends inwardly into the interior of the barrel 30. The cylindrical flange 12 is supported on a support, and the other portion of the lower closure 10 is received in the interior of the barrel 30, so that the first edge stiffening wire 37 engages the outer end face of the plane stage 11. Such a position renders it possible to fixedly connect in substantially axial direction, the lower closure 10 with the lattice barrel 30.

The lower closure 10 is so shaped as not to prevent installing of the barrel 30 on the stage 11.

In collapsed position the upper closure 23 is inverted so that the bent portion thereof is now directed down and inwardly into the interior of the barrel 30. Meanwhile, the second edge stiffening wire 31 engages the outer end face of the plane stage 21. Also in this case such a connection insures a reliable fixed axial connection of the upper closure with the barrel. The upper closure 23 is so shaped as not to prevent the barrel 30 from receiving substantially the entire upper closure 23. The dimensions of the lower and upper closures are so arranged as to render it possible to invert both closures, so that both bent portions extend inwardly into the interior of the barrel. The tip 26 of the upper closure is received in the recess 13 of the lower closure when the latter is in its inverted position.

FIG. 3 shows the way the cages in the collapsible position according to the present invention can be stored one on the other. To accomplish this a plurality of such cages are arranged in the lower row. The next row of cages can be installed on the cylindrical flange 22 of the upper closures, which flanges are in the same plane. Due to this fact, it becomes possible to store the cages in vertical as well as in horizontal direction.

It will be understood that each of the elements described above, or two or more together, may also find a useful application in other types of a collapsible container, particularly a bird-cage differing from the types described above.

While the invention has been illustrated and described as embodied in a collapsible container, particularly a bird-cage, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A collapsible bird-container of the cage type, comprising an elongated cage-type barrel having a rigid peripheral wall bounding the interior of the barrel and an upper and a lower open end; a first discrete end closure detachably mountable on said barrel in an operative position for closing said upper end, said first closure being formed with a first reduced cross-section portion directed upwardly when said closure is installed on said barrel in said operative position; a second discrete end closure detachably mountable on said barrel in an operative position for closing said lower end, said second closure also being formed with a second reduced cross-section portion directed downwardly when said second closure is installed on said barrel in said operative position, at least one of said end closures being invertable to a storage position in which the reduced cross-section portion thereof extends into and said one end closure is received substantially completely in said barrel to thereby decrease the overall height of the container in order for the container to require less space for storage or transport; and means for detachably securing said end closures to said barrel in at least said operative positions.

2. A container as defined in claim 1, wherein said first end closure is of cupola-shaped configuration.

3. A container as defined in claim 1, wherein said barrel is of cylindrical outline.

4. A container as defined in claim 1, wherein said barrel is of metal lattice.

5. A container as defined in claim 1, wherein said end closures are of synthetic plastic material.

6. A container as defined in claim 1, said end closures each having an additional portion adjacent to and merging into the associated reduced cross-section portion via an annular shoulder and said annular shoulders abutting a respective end of said barrel when the respective closure is inverted and its reduced cross-section portion inserted into the barrel.

* * * * *